(12) United States Patent
Smith (10) Patent No.: US 9,705,256 B1
(45) Date of Patent: Jul. 11, 2017

(54) INSULATED GROUNDING HUB LOCKNUT UNIT

(71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 31 days.

(21) Appl. No.: 14/994,612

(22) Filed: Jan. 13, 2016

(51) Int. Cl.
  *F16B 33/00* (2006.01)
  *H01R 13/648* (2006.01)
  *H01R 4/26* (2006.01)
  *H01R 4/56* (2006.01)

(52) U.S. Cl.
  CPC ............. *H01R 13/648* (2013.01); *H01R 4/26* (2013.01); *H01R 4/56* (2013.01)

(58) Field of Classification Search
  CPC .................................................. H01R 13/648
  USPC .......... 411/373, 429, 431, 430; 439/98, 101, 439/100; 174/78
  See application file for complete search history.

(56) References Cited

U.S. PATENT DOCUMENTS

| | | | |
|---|---|---|---|
| 1,754,601 | A | 4/1930 | Borden |
| 3,027,533 | A | 3/1962 | Monson |
| 3,492,625 | A | 1/1970 | Bromberg |
| 3,967,872 | A | 7/1976 | Mooney et al. |
| 4,159,859 | A | 7/1979 | Shemtov |
| 4,189,198 | A | 2/1980 | Reichman |
| 4,210,374 | A * | 7/1980 | Churla .................... H01R 4/60 285/404 |
| 4,248,490 | A | 2/1981 | Bachle |
| D277,454 | S | 2/1985 | Meinhardt |
| 4,806,108 | A | 2/1989 | Meinhardt |
| 4,831,213 | A * | 5/1989 | Espevik ................ F16L 41/005 174/651 |

(Continued)

FOREIGN PATENT DOCUMENTS

| | | |
|---|---|---|
| CA | 2 605 681 A1 | 4/2008 |
| CA | 2 571 100 C | 6/2008 |
| WO | 2011/146687 A2 | 11/2011 |

OTHER PUBLICATIONS

"Commercial Products: Insulated Grounding Bushings for Conduit & IMC"; Appleton, emersonindustrial.com, Jan. 2011; http://www.emersonindustrial.com/en-US/documentcenter/EGSElectricalGroup/products_documents/commercial_products/commercial_fitting/rigid_imc_fitting/ss_insulated_ground_bush_threaded_rmc_imc/AEC_MC007_SetScrew_Insulated_Ground_Bushings_RMC_IMC.pdf; pp. 1628-1631.

(Continued)

*Primary Examiner* — Gary Estremsky
(74) *Attorney, Agent, or Firm* — Ware, Fressola, Maguire & Barber LLP (57) ABSTRACT

An insulated grounding hub locknut for securing a conduit connector or threaded conduit has a locknut and a snap-on insulator. The outer surface of the locknut has grounding-lug mounting pads and raised members, and the inner surface has internal threads for screwing onto threads of conduit connector or a threaded end of the electrical conduit. The snap-on insulator has an annular body with an end face, the outer side of which has a cylindrical surface arranged to snap onto the raised members of the locknut. The cylindrical surface has open slots to receive the mounting pads on the locknut. The end face also has an inner cylindrical sleeve arranged to be placed inside the throat of the first cylindrical member of conduit connector.

11 Claims, 6 Drawing Sheets

(56) References Cited

U.S. PATENT DOCUMENTS

| | | | | |
|---|---|---|---|---|
| 4,842,548 | A | * | 6/1989 | Bolante .................. F16L 47/28 |
| | | | | 174/653 |
| 4,885,429 | A | * | 12/1989 | Schnittker ............ H02G 3/0691 |
| | | | | 174/668 |
| 4,954,084 | A | | 9/1990 | Pugh et al. |
| 4,960,388 | A | * | 10/1990 | Frantz .................. H01R 13/648 |
| | | | | 439/404 |
| 5,067,750 | A | * | 11/1991 | Minneman .............. F16B 37/16 |
| | | | | 285/354 |
| 5,350,266 | A | * | 9/1994 | Espey ...................... B62J 23/00 |
| | | | | 403/375 |
| 5,722,841 | A | * | 3/1998 | Wright ................. H01R 9/0518 |
| | | | | 174/78 |
| 5,929,383 | A | * | 7/1999 | Marik .................. H01R 13/648 |
| | | | | 174/78 |
| 7,281,932 | B2 | * | 10/2007 | Cheng .................. H02G 3/0616 |
| | | | | 439/100 |
| 7,425,153 | B1 | * | 9/2008 | Miller .................. H01R 9/0524 |
| | | | | 439/578 |
| 7,485,806 | B1 | * | 2/2009 | Gretz .................. H02G 3/0666 |
| | | | | 174/135 |
| D618,626 | S | | 6/2010 | Kiely |
| 7,868,252 | B2 | | 1/2011 | Spahic |
| 8,129,633 | B1 | | 3/2012 | Shemtov |
| 8,899,998 | B2 | | 12/2014 | Pyron |
| 8,979,557 | B2 | * | 3/2015 | Dinh .................... H02G 3/0691 |
| | | | | 174/78 |

OTHER PUBLICATIONS

"Conduit & Cable Fillings," Madison Electric Products, meproducts.net, 2013; http://meproducts.net/products?category+A (2nd page for links to pages for Zinc & Malleable Iron), pp. 1-4.

"Bushing, Conduit, 2 In," Grainger, grainger item #3LN56, Mfr. Model+3LN56, UNSPSC #39121312, accessed Sep. 2015; http://www.grainger.com/product/GRAINGER-APPROVED-Bushing-3LN56; picture, pp. 1-4.

"Halex: 2 in. Rigid Insulated Metallic Grounding Bushing," Home Depot, homedepot.com, Model #99526, Internet #100183159, Store SKU #293730; accessed Sep. 2015; http://www.homedepot.com/p/Halex-2-in-Rigid-Insulated-Metallic-Grounding-Bushing-99526/100183159; pp. 1-3.

"Raco: 2in. Ground Bushing," Home Depot, homedepot.com, Model #1218-5, Internet #203671592, Store SKU #293730; accessed Sep. 2015; http://www.homedepot.com/p/Raco-2-in-Insulated-Ground-Bushing-1218-5/203671592; pp. 1-3.

\* cited by examiner

INSULATED GROUNDING HUB LOCKNUT UNIT

FIELD OF THE INVENTION

The present invention is related to a locknut and, more specifically, to an insulated grounding hub locknut.

BACKGROUND OF THE INVENTION

Grounding hub locknuts are typically used in association with conduit connectors. Such conduit connectors are generally used to terminate electrical conduit with an electrical panel box.

An electrical panel box is commonly used in electrical wiring installations. At least one of the sidewalls of the electrical panel box has a plurality of knockout holes to receive electrical conductors in an electrical conduit. The conduit usually terminates at a side of the electrical panel box through a knockout hole and is secured by a conduit connector. The conduit connector has first and second hollow cylindrical members, with outer threaded portions. The first and second cylindrical members are separated by a separation ring. The second cylindrical member is typically dimensioned to receive a locknut and compression ring to secure an electrical conduit inserted therein. The first cylindrical member is dimensioned to be placed inside the electrical panel box through a knockout hole. To secure the conduit connector to the electrical box, a locknut is screwed onto the threaded portion of the first cylindrical member. The conduit connector fitting and the locknut are usually made of a metal for grounding purposes. The locknut has one or more mounting pads with threaded holes for mounting a grounding lug to which a ground wire (conductor) is secured. The terminating end of first cylindrical portion of the conduit connector fitting is usually exposed inside the electrical box. The terminating end can be sharp, rough and/or abrasive and may cause damage to the insulation or electrical conductors entering the panel box via the attached electrical conduit. There is a need to insulate and cover the locknut so as to minimize conductor chaffing, especially an insulated grounding hub locknut unit that is easy to install and which is easy to fabricate.

SUMMARY OF THE INVENTION

The present invention relates to an insulated grounding hub locknut unit, comprising a locknut and a snap-on insulator having a first side and a second side, wherein the locknut comprises a receiving end, an inner surface, and an outer surface with a circumferential area, the inner surface having threads configured to screw onto an electrical conduit connector or an electrical conduit having a threaded end, the outer surface having one or more mounting pads along the circumferential area, each of said one or more mounting pads configured for attaching a grounding lug, and wherein the snap-on insulator comprises an end face located on the first side, the end face having an inner periphery and an outer periphery, a substantially cylindrical surface having a first surface end and a second surface end, the second surface end dimensioned to snap onto the receiving end of the locknut, the first surface end joined to the outer periphery of the end face, the cylindrical surface having one or more open slots formed therein, each slot dimensioned to receive one mounting pad of the locknut, and a cylindrical sleeve extended from the inner periphery of the end face toward the second side of the snap-on insulator.

Another embodiment of the present invention is the insulated grounding hub locknut unit as described above, wherein the cylindrical sleeve is dimensioned to be placed into at least part of a throat of the electrical conduit connector or a throat of an electrical conduit.

Another embodiment of the present invention is the insulated grounding hub locknut unit as described above, wherein the outer surface of the locknut further comprises one or more protuberant members distributed along the circumferential area, spaced from said one or more mounting pads, the one or more protuberant members each having a height extended from the circumferential area dimensioned to receive the second surface end of the cylindrical surface of the snap-on insulator.

A further embodiment of the present invention is the insulated grounding hub locknut unit as described above, wherein each of the one or more protuberant members comprises a protrusion located at the receiving end of the locknut, and the cylindrical surface of the snap-on insulator further has one or more openings formed therein, each opening dimensioned to receive the protrusion of the one of the or more protuberant members.

A still further embodiment of the present invention is the insulated grounding hub locknut unit as described above, wherein the one or more protuberant members comprise three protuberant members each having a protrusion.

Another embodiment of the present invention is the insulated grounding hub locknut unit as described above, wherein the one or more mounting pads comprise three mounting pads.

A further embodiment of the present invention is the insulated grounding hub locknut unit as described above, wherein the snap-on insulator is made of plastic.

A still further embodiment of the present invention is the insulated grounding hub locknut unit as described above, wherein the locknut is made of a zinc alloy.

DETAILED DESCRIPTION

Figure 1:
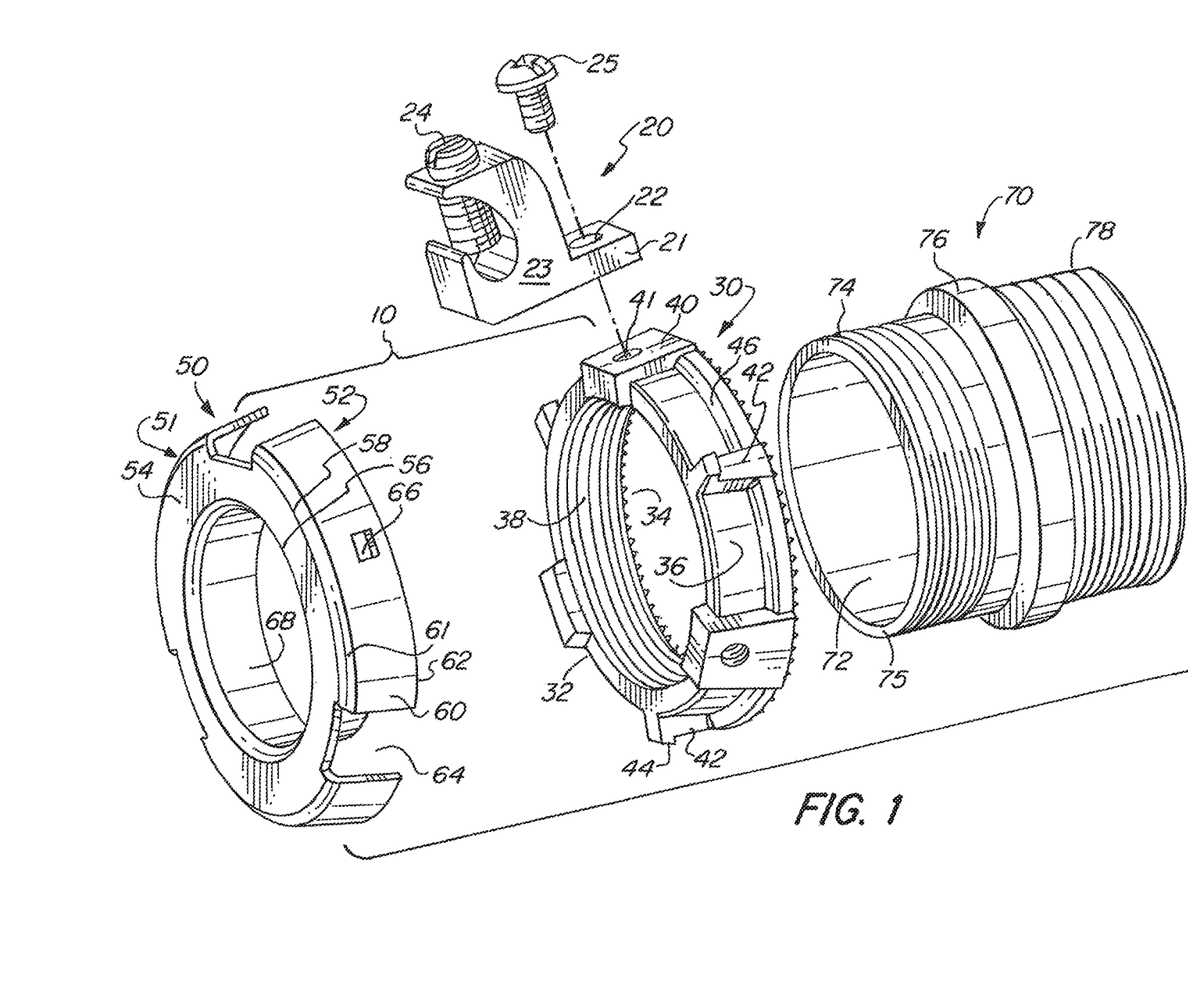
FIG. 1 is an exploded perspective view of various components for securing an electrical conduit to an electrical panel box, including an insulated grounding hub locknut unit according to an embodiment of the present invention.
Figure 2:
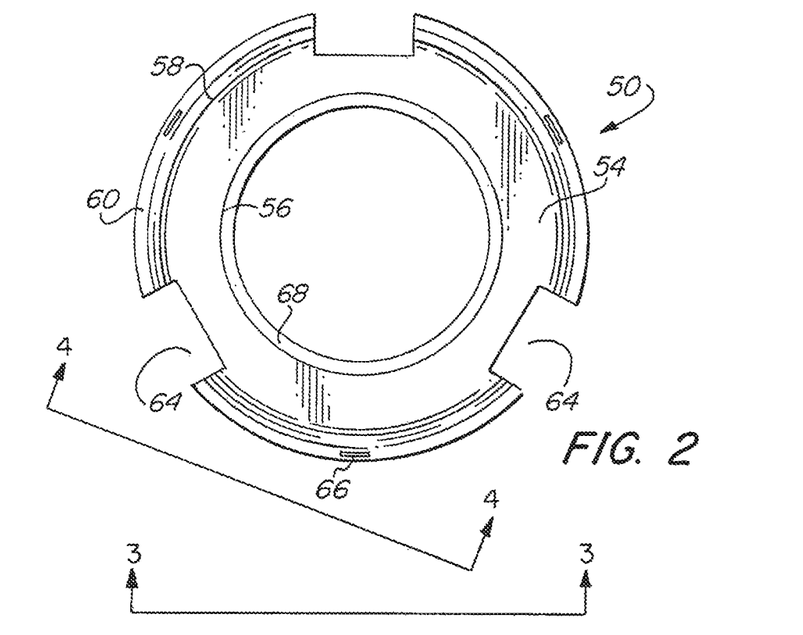
FIG. 2 is a top view of a snap-on insulator of the insulated grounding hub locknut unit as shown in FIG. 1.
Figure 3:
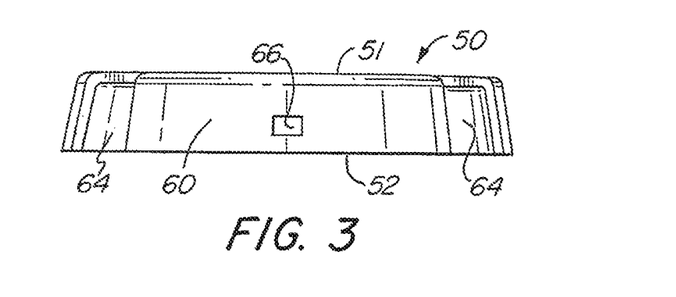
FIG. 3 is a side view of the snap-on insulator taken along line 3-3 of FIG. 2.
Figure 4:
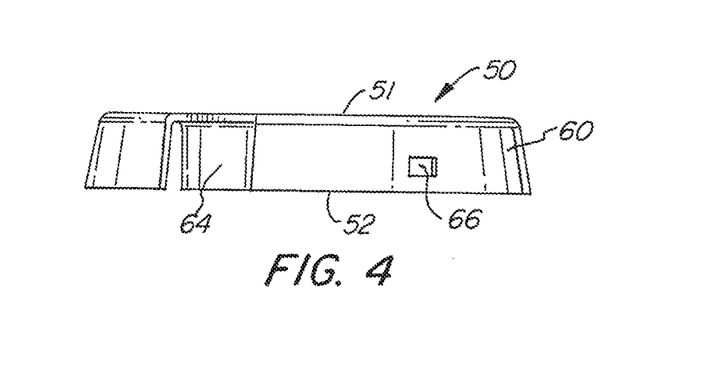
FIG. 4 is another side view of the snap-on insulator taken along line 4-4 of FIG. 2.
Figure 5:
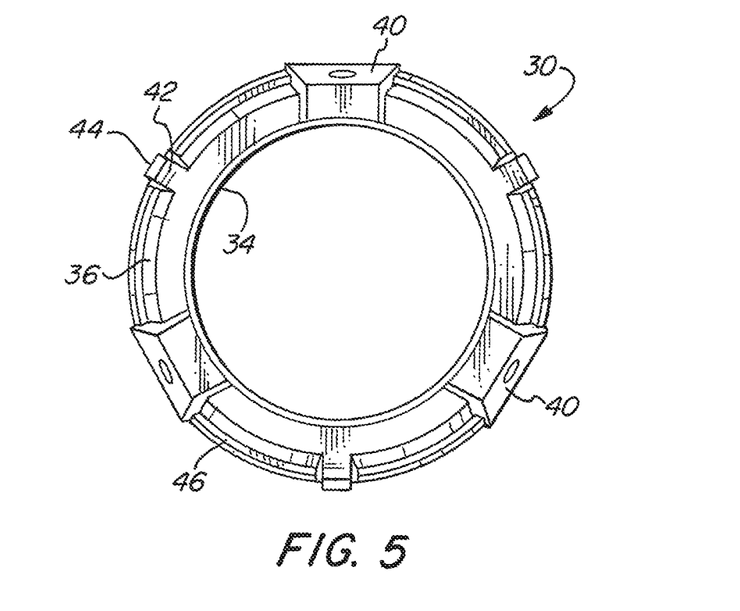
FIG. 5 is a top view of the locknut shown in FIG. 1, according to an embodiment of the present invention.
Figure 6:
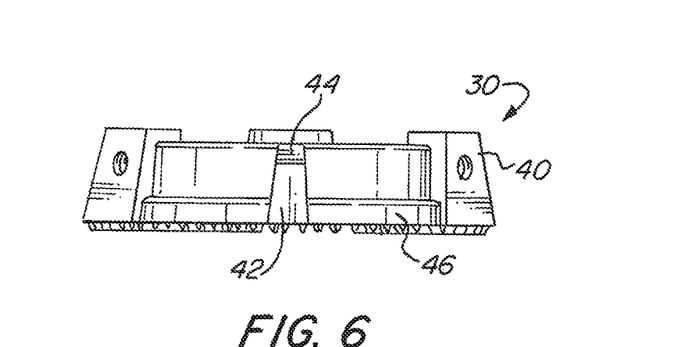
FIG. 6 is a side view of the locknut.
Figure 7:
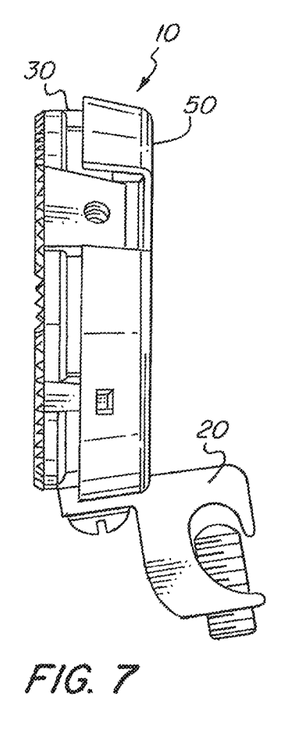
FIG. 7 is a side view of an assembled insulated grounding hub locknut unit shown in FIG. 1.
Figure 8:
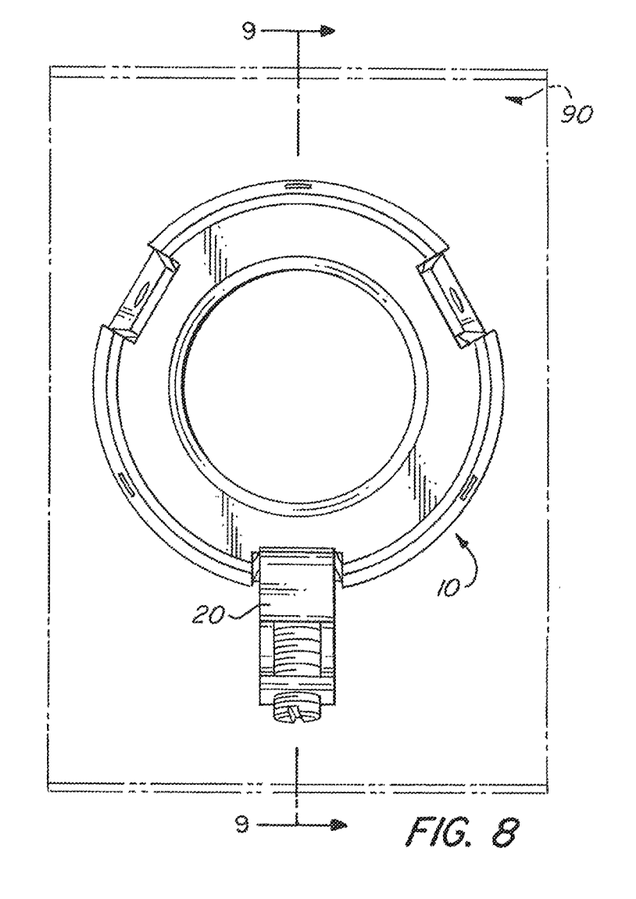
FIG. 8 is a top view of the insulated grounding hub locknut unit secured to an electrical panel box.
Figure 9:
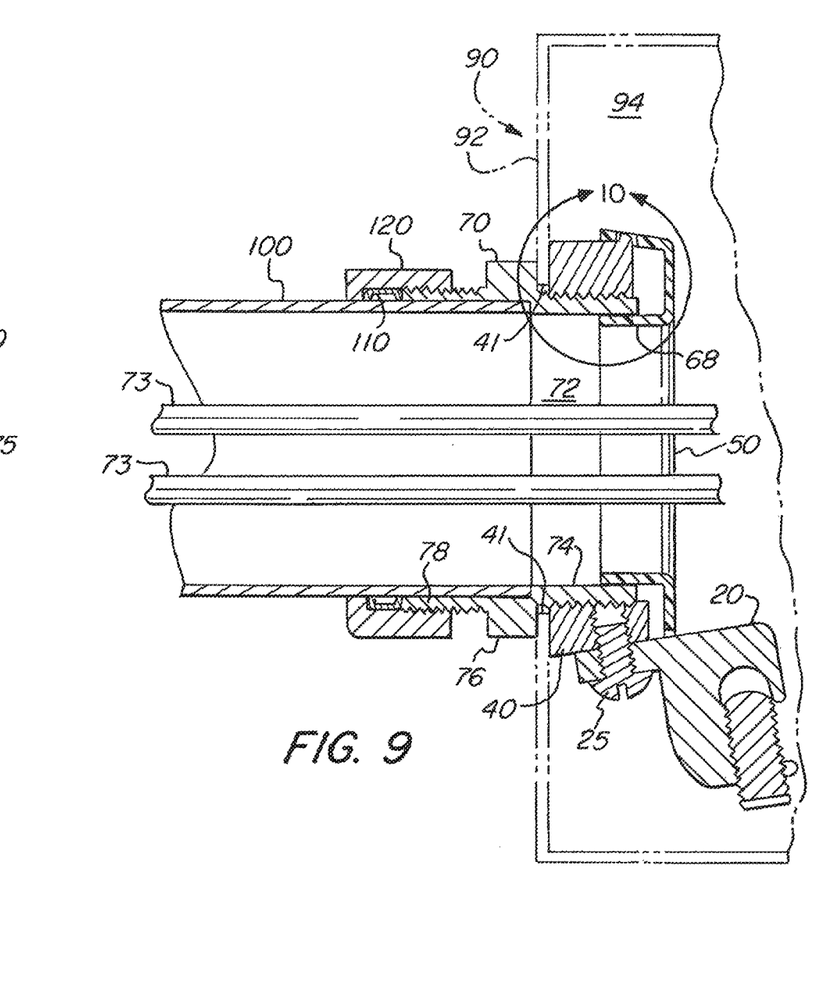
FIG. 9 is a cross-sectional view of the insulated grounding hub locknut unit taken along line 9-9 of FIG. 8.

As seen in FIGS. 1, 7 and 9, the present invention is directed to an insulated grounding hub locknut unit 10 configured to secure a conduit connector 70 to an electrical panel box 90. As shown in FIGS. 1 and 7, the insulated grounding hub locknut unit 10 comprises a locknut 30 and a snap-on insulator 50. The locknut 30 is dimensioned to secure a conduit connector 70 to an electrical panel box 90 (see FIG. 9). As shown in FIGS. 1-4, the snap-on insulator 50 has an annular body having a first side 51 and an opposing second side 52. The annular body has an end face 54 at the first side 51. The end face 54 has an inner periphery 56 and an outer periphery 58. The snap-on insulator 50 has a substantially cylindrical outer surface 60 with a first surface end 61 and a second surface end 62 at second side 52. The first surface end 61 joins to the outer periphery 58 of the end face 54 and the second surface end 62 is dimensioned to snap onto a receiving end 32 of the locknut 30. As shown in FIGS. 1, 5 and 6, the locknut 30 has an inner surface 34 with threads 38 and an outer surface 36 with a circumferential area. The outer surface 36 has one or more mounting pads 40 distributed along the circumferential area. Each of the mounting pads 40 is configured for attaching a grounding lug 20.

The snap-on insulator 50 also has one or more open slots 64 formed on the cylindrical surface 60, the slots dimensioned to receive the mounting pads 40 of locknut 30 when the snap-on insulator 50 is snapped onto the receiving end 32 of locknut 30. According to one embodiment of the present invention, the outer surface 36 of the locknut also has one or more protuberants or raised members 42 distributed along the circumferential area, spaced from mounting pads 40. As seen from FIGS. 1 and 10, each protuberant member 42 has a height extended from the circumferential area of the outer surface 36 arranged to receive the second surface end 62 of cylindrical surface 60 of snap-on insulator 50. According to another embodiment of the present invention, each of the protuberant members 42 also has a protrusion 44 extending radially from the height of protuberant member 42, and the cylindrical surface 60 of snap-on insulator 50 has one or more openings 66 formed therein, each opening dimensioned to receive a protrusion 44 of protuberant member 42 for securing the snap-on insulator 50 to the locknut 30 (see FIGS. 9 and 10).

Figure 10:
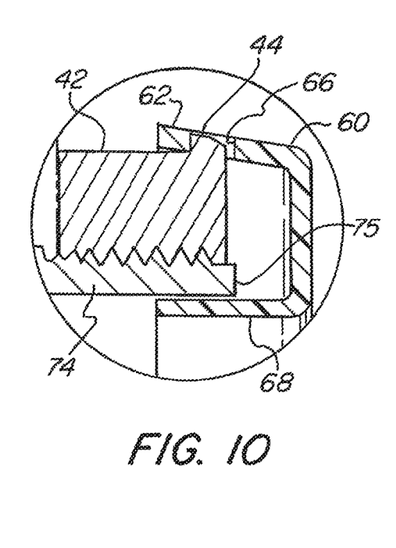
FIG. 10 is a detailed view of the insulated grounding hub locknut unit taken along circle 10 of FIG. 9 showing how the snap-on insulator snaps onto the locknut and the position of the cylindrical sleeve of the snap-on insulator inside part of the throat of the conduit connector.

As shown in FIG. 1, the conduit connector 70 has a first cylindrical member 74 and a second cylindrical member 78 separated by a separation ring 76. The first and second cylindrical members have hollow throats 72 and the separation ring is also hollow so as to allow electrical conductors (not shown) to pass therethrough. When the conduit connector 70 is secured onto an electrical panel box 90, the first cylindrical member 74 is placed inside the electrical panel box 90 through a knockout hole 41 on a side wall 92 (see FIG. 9), and the threads 38 of the locknut 30 are dimensioned for screwing onto the first cylindrical member 74. As shown in FIGS. 9 and 10, the terminating end 75 of first cylindrical member 74 is exposed in the interior 94 of the electrical box 90. The terminating end 75 of the first cylindrical member 74 can be sharp, rough and/or abrasive so as to cause damage to the electrical conductors 73 passing through the insulated grounding locknut inside the electrical box 90. In order to protect the electrical conductors from abrasion damage, the snap-on insulator 50 also has a cylindrical sleeve 68 extended from the inner diameter 56 of end face 54 toward the second side 52 of snap-on insulator 50, as shown in FIGS. 1, 2, 3 and 9. As can be seen from FIGS. 1 and 9, the cylindrical sleeve 68 is dimensioned to be placed into at least part of throat 72 of the first cylindrical member 74 of conduit connector 70. As such, the entire terminating end 75 of first cylindrical member 74 of conduit connector 70 is effectively surrounded by the annular body of the snap-on insulator 50.

As shown in FIGS. 1 and 9, the locknut 30 has a number of mounting pads 40 on the circumferential area of outer surface 36. Each of the mounting pads 40 has a threaded hole 41 for attaching a grounding lug 20. The grounding lug 20 has a wire clamp 23 with a pressure screw 24 for clamping an ground wire or conductor (not shown), and a tab 21 with a through hole 22 for attaching to any one of the mounting pads 40 by a mounting screw 25. As shown in FIGS. 1, 5 and 6, the locknut 30 also has a substantially circular rib 46 at the base of locknut 30.

In order to attach a conduit 100 onto an electrical panel box or enclosure 90 through a conduit connector 70 as shown in FIG. 9, a compression ring 110 is placed at the end of the second cylindrical member 78 of conduit connector 70, and a threaded cap 120 is screwed onto the second cylindrical member 78, causing the compression ring 110 to press against conduit 100 and thereby secure the conduit to the conduit connector.

Figure 11:
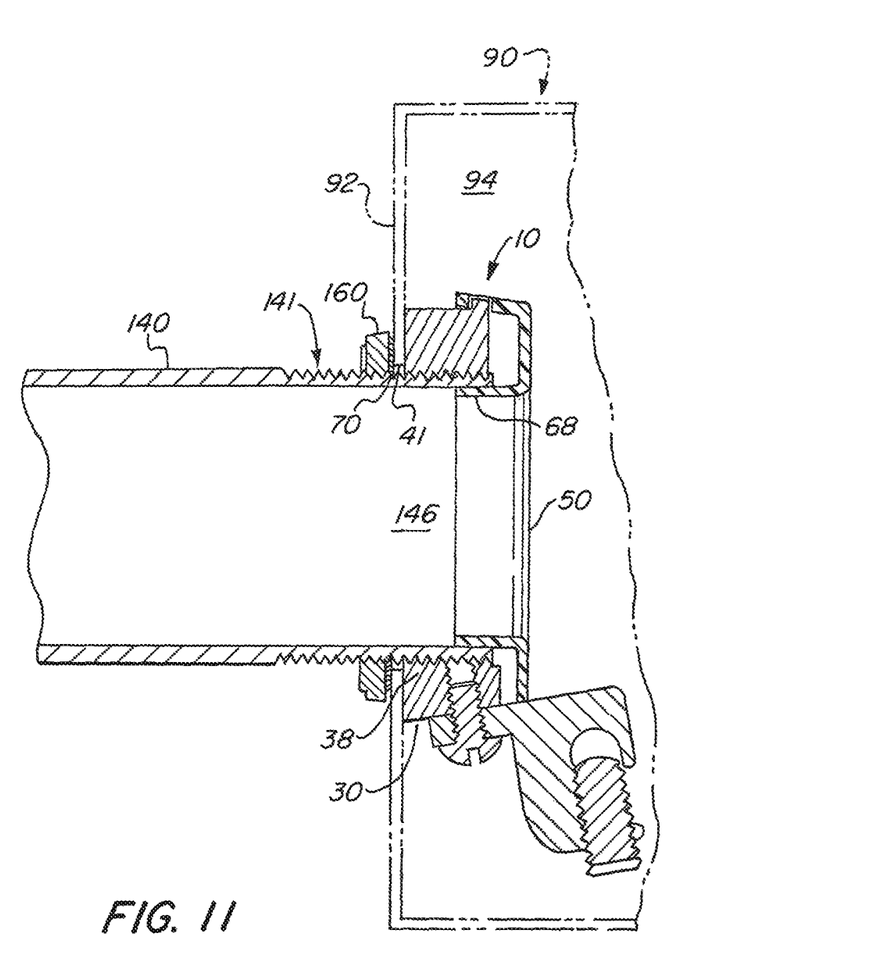
FIG. 11 is a cross-sectional view of the insulated grounding hub locknut unit wherein an electrical conduit is directly inserted into an electrical panel box and the insulated grounding hub locknut unit is attached thereto.

Alternatively, the insulated grounding hub unit 10 is directly attached to an electrical conduit 140 as shown in FIG. 11. As shown in FIG. 11, the electrical conduit 140 has a threaded end 141. A locknut 160 is threaded onto threaded end 141 outside knockout hole 41. A compression ring 170 can optionally be placed between locknut 160 and sidewall 92 of the electrical panel box 90. The insulated grounding hub locknut unit 10 is threaded onto threaded end 141 inside the panel box. As shown in FIG. 11, the sleeve 68 of the snap-on insulator 50 is dimensioned to be placed into at least part of throat 146 of the electrical conduit 140.

According to embodiments of the present invention, the locknut 30 can be made of a zinc alloy, the wire clamp 23 and the tab 21 of the grounding lug 20 can be made of tin-plated aluminum, the mounting screw 25 can be made of zinc-plated steel, and the snap-on insulator can be made of plastic. It should be understood that the locknut 30, the wire clamp 23 including the tab 21, and the mounting screw 25 can also be made of other metals and alloys; and the snap-on insulator 50 can also be made of a different electrically-insulating material.

Thus, although the present invention has been described with respect to one or more embodiments thereof, it will be understood by those skilled in the art that the foregoing and various other changes, omissions and deviations in the form and detail thereof may be made without departing from the scope of this invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An insulated grounding hub locknut unit, comprising:
a locknut; and
a snap-on insulator having a first side and a second side, wherein the locknut comprises:
   a receiving end;
   an inner surface; and
   an outer surface with a circumferential area, the inner surface having threads configured to screw onto an electrical conduit connector or an electrical conduit having a threaded end, the outer surface having one or more mounting pads along the circumferential area, each of said one or more mounting pads configured for attaching a grounding lug, and
wherein the snap-on insulator comprises:
   an end face located on the first side, the end face having an inner periphery and an outer periphery,
   a substantially cylindrical surface having a first surface end and a second surface end, the second surface end dimensioned to snap onto the receiving end of the locknut, the first surface end joined to the outer periphery of the end face, the cylindrical surface having one or more open slots formed therein, each slot dimensioned to receive one mounting pad of the locknut, and
   a cylindrical sleeve extended from the inner periphery of the end face toward the second side of the snap-on insulator.

2. The insulated grounding hub locknut unit according to claim 1, wherein the cylindrical sleeve is dimensioned to be placed into at least part of a throat of the electrical conduit connector or a throat of an electrical conduit.

3. The insulated grounding hub locknut unit according to claim 2, wherein the outer surface of the locknut further comprises one or more protuberant members distributed along the circumferential area, spaced from said one or more mounting pads, said one or more protuberant members each having a height extended from the circumferential area dimensioned to receive the second surface end of the cylindrical surface of the snap-on insulator.

4. The insulated grounding hub locknut unit according to claim 3, wherein each of said one or more protuberant members comprises a protrusion located at the receiving end of the locknut, and the cylindrical surface of the snap-on insulator further has one or more openings formed therein, each opening dimensioned to receive the protrusion of said one of said or more protuberant members.

5. The insulated grounding hub locknut unit according to claim 4, wherein said one or more protuberant members comprise three protuberant members each having a protrusion.

6. The insulated grounding hub locknut unit according to claim 1, wherein said one or more mounting pads comprise three mounting pads.

7. The insulated grounding hub locknut unit according to claim 1, wherein the snap-on insulator is made of plastic.

8. The insulated grounding hub locknut unit according to claim 1, wherein the locknut is made of a zinc alloy.

9. The insulated grounding hub locknut unit according to claim 1, wherein the outer surface of the locknut further comprises one or more protuberant members distributed along the circumferential area, spaced from said one or more mounting pads, said one or more protuberant members each having a height extended from the circumferential area dimensioned to receive the second surface end of the cylindrical surface of the snap-on insulator.

10. The insulated grounding hub locknut unit according to claim 9, wherein each of said one or more protuberant members comprises a protrusion located at the receiving end of the locknut, and the cylindrical surface of the snap-on insulator further has one or more openings formed therein, each opening dimensioned to receive the protrusion of said one of said or more protuberant members.

11. The insulated grounding hub locknut unit according to claim 10, wherein said one or more protuberant members comprise three protuberant members each having a protrusion.

* * * * *